(12) United States Patent
Patel et al.

(10) Patent No.: US 8,376,708 B2
(45) Date of Patent: Feb. 19, 2013

(54) DRIVETRAIN SYSTEM FOR A WIND TURBINE GENERATOR AND METHOD OF ASSEMBLING THE SAME

(75) Inventors: Priyangu C. Patel, Simpsonville, SC (US); Edwin Hidding, Rhede (DE); Gary R. Barnes, Delanson, NY (US); Patrick Lee Jansen, Scotia, NY (US); Adam Daniel Minadeo, Greenville, SC (US); Stephen B. Johnson, Greenville, SC (US); James H. Madge, Simpsonville, SC (US); Blake Weldon Wilson, Scotia, NY (US); Eric Steven Buskirk, Guilderland, NY (US); Murtuza Lokhandwalla, Clifton Park, NY (US); Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 853 days.

(21) Appl. No.: 12/495,066

(22) Filed: Jun. 30, 2009

(65) Prior Publication Data
US 2010/0329867 A1    Dec. 30, 2010

(51) Int. Cl.
*A47C 21/04* (2006.01)
*B63H 1/00* (2006.01)
*F01D 25/00* (2006.01)
*F03D 9/00* (2006.01)
*H02P 9/04* (2006.01)

(52) U.S. Cl. .................. 416/169 R; 290/55; 416/170 R

(58) Field of Classification Search ............... 415/122.1, 415/123, 4.3, 4.5, 1; 416/170 R, 1, 169 R; 290/44, 55
See application file for complete search history.

(56) References Cited

U.S. PATENT DOCUMENTS

| | | | | |
|---|---|---|---|---|
| 4,039,848 | A * | 8/1977 | Winderl | 290/55 |
| 5,663,600 | A * | 9/1997 | Baek et al. | 290/55 |
| 6,784,634 | B2 * | 8/2004 | Sweo | 318/727 |
| 7,109,600 | B1 * | 9/2006 | Bywaters et al. | 290/55 |
| 2006/0071575 | A1 * | 4/2006 | Jansen et al. | 310/266 |
| 2007/0166147 | A1 * | 7/2007 | Merswolke et al. | 415/4.1 |
| 2008/0078631 | A1 * | 4/2008 | Erlston et al. | 188/159 |
| 2009/0026771 | A1 * | 1/2009 | Bevington et al. | 290/55 |
| 2009/0058094 | A1 | 3/2009 | Jansen et al. | |

FOREIGN PATENT DOCUMENTS

| EP | 0811764 A1 | 12/1997 |
|---|---|---|
| WO | 2008113318 A2 | 9/2008 |

* cited by examiner

*Primary Examiner* — Christopher Verdier
*Assistant Examiner* — Su Htay
(74) *Attorney, Agent, or Firm* — James McGinness, Esq.; Armstrong Teasdale LLP

(57) ABSTRACT

A drivetrain for a wind turbine includes a gearbox and a generator. The gear box includes a housing and an output shaft that is rotatably coupled within the housing, wherein the gearbox further includes at least one bearing positioned between the housing and the output shaft. The generator includes a stator coupled to the housing such that the stator is positioned radially inward from the housing, and a rotor coupled to the output shaft such that the rotor is positioned radially inward from the stator.

25 Claims, 12 Drawing Sheets

DRIVETRAIN SYSTEM FOR A WIND TURBINE GENERATOR AND METHOD OF ASSEMBLING THE SAME

BACKGROUND OF THE INVENTION

The field of the disclosure relates generally to wind turbines and, more particularly, to compact drivetrain assemblies for wind turbines.

Wind turbines have received increased attention as environmentally safe and relatively inexpensive alternative energy sources. Wind turbines do not emit greenhouse gases (GHGs) and, therefore, do not contribute to global warming. With the growing interest in wind generated electricity, considerable efforts have been made to develop wind turbines that are reliable and efficient.

Wind is usually considered to be a form of solar energy caused by uneven heating of the atmosphere by the sun, irregularities of the Earth's surface, and rotation of the Earth. Wind flow patterns are modified by the Earth's terrain, bodies of water, and vegetation. The terms "wind energy" and "wind power" describe a process by which wind is used to rotate a shaft and subsequently generate mechanical power or electricity.

Some known wind turbines are used to convert the kinetic energy in the wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the cube of the wind speed. As wind speed doubles, the capacity of wind generators increases almost eightfold.

Some known, commercially available wind turbines utilize geared drivetrains to connect the turbine blades to the electrical generators. The wind turns the turbine blades, which spin a low speed shaft, which feeds into a gearbox having a higher speed output shaft. This higher speed output shaft connects to a generator and makes electricity. The geared drive aims to increase the velocity of the mechanical motion.

The industry standard drivetrain for large (e.g., >1 Megawatt (MW)) wind turbines consists of discrete gearbox and generator units that are separately mounted to a mainframe (also commonly called a bedframe or bedplate). Power is transferred from the gearbox to the generator via a flexible "high-speed" shaft coupling. This arrangement forces the gearbox and the generator to be physically distanced from each other, as well as requires both the output shaft of the gearbox and the input shaft of the generator to be separately supported by gearbox bearings and generator bearings, respectively.

BRIEF DESCRIPTION OF THE INVENTION

One aspect is directed to a drivetrain for a wind turbine. The drivetrain includes a gearbox and a generator. The gear box includes a housing and an output shaft that is rotatably coupled within the housing, and a braking system that is operatively coupled to the gearbox, wherein the braking system includes a rotary component and a stationary component. The gearbox further includes at least one bearing positioned between the housing and the output shaft. The generator includes a stator coupled to the housing such that the stator is positioned radially outward from the housing, and a rotor coupled to the output shaft such that the rotor is positioned radially inward from the stator, wherein the gearbox output shaft and the at least one bearing facilitate supporting the braking system rotary component.

Another aspect is directed to a wind turbine that includes a nacelle and a drivetrain positioned within the nacelle. The drivetrain includes a gearbox, a generator, and a braking system that is operatively coupled to the gearbox, wherein the braking system includes a rotary component and a stationary component. The gear box includes a housing and an output shaft that is rotatably coupled within the housing. The gearbox further includes at least one bearing positioned between the housing and the output shaft. The generator includes a stator coupled to the housing such that the stator is positioned radially outward from the housing, and a rotor coupled to the output shaft such that the rotor is positioned radially inward from the stator, wherein the gearbox output shaft and the at least one bearing facilitates supporting the braking system rotary component.

Yet another aspect is directed to a method for assembling a drivetrain for a wind turbine. The method includes rotatably coupling an output shaft within a gearbox housing, positioning at least one bearing between the gearbox housing and the output shaft to facilitate rotation of the output shaft, coupling a stator within the housing such that the stator is positioned radially outward from the housing and coupling a rotor to the output shaft such that the rotor is positioned radially inward from the stator.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Figure 1:
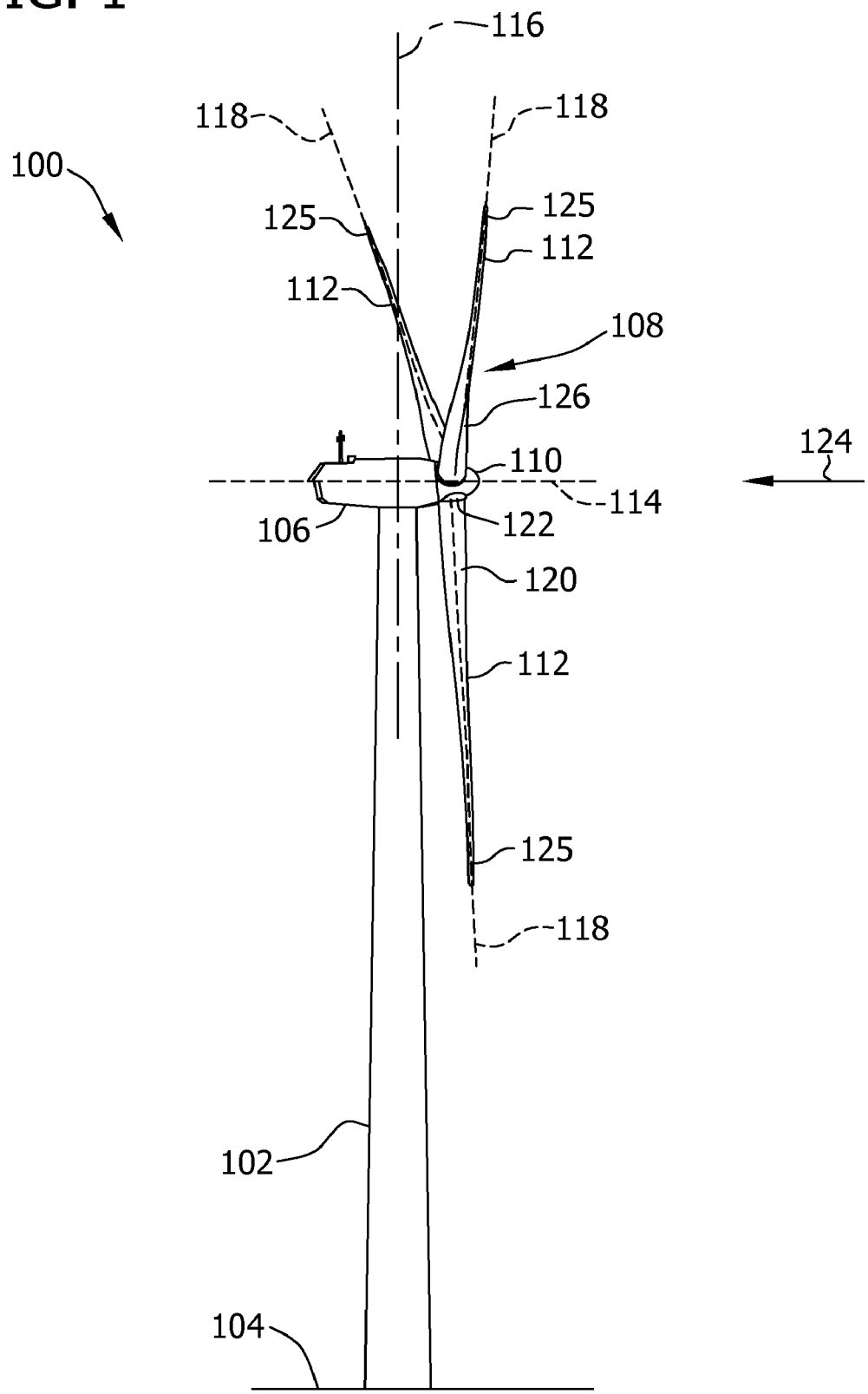
FIG. 1 is a side perspective view of an exemplary wind turbine generator.

FIG. 1 is a schematic view of an exemplary wind turbine generator 100. In the exemplary embodiment, wind turbine generator 100 is a horizontal axis wind turbine. Alternatively, wind turbine generator 100 may be a vertical axis wind turbine. Wind turbine generator 100 has a tower 102 extending from a supporting surface 104, a nacelle 106 coupled to tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enables wind turbine generator 100 to function as described herein. In the exemplary embodiment, tower 102 is fabricated from tubular steel and has a cavity (not shown in FIG. 1) extending between supporting surface 104 and nacelle 106. Alternatively, tower 102 is any tower that enables wind turbine generator 100 to function as described herein including, but not limited to, a lattice tower. The height of tower 102 is any value that enables wind turbine generator 100 to function as described herein.

Blades 112 are positioned about rotor hub 110 to facilitate rotating rotor 108, thereby transferring kinetic energy from wind 124 into usable mechanical energy and, subsequently, electrical energy. Rotor 108 and nacelle 106 are rotated about tower 102 on a yaw axis 116 to control a perspective of blades 112 with respect to a direction of wind 124. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122. Each blade 112 also includes a blade tip portion 125.

In the exemplary embodiment, blades 112 have a length between 30 meters (m) (98 feet (ft)) and 70 m (229 ft), however these parameters form no limitations to the instant disclosure. Alternatively, blades 112 may have any length that enables wind turbine generator to function as described herein. As wind 124 strikes each blade 112, blade lift forces (not shown) are induced on each blade 112 and rotation of rotor 108 about rotation axis 114 is induced as blade tip portions 125 are accelerated. A pitch angle (not shown) of blades 112, i.e., an angle that determines a perspective of each blade 112 with respect to the direction of wind 124, may be changed by a pitch adjustment mechanism (not shown in FIG. 1). Specifically, increasing a pitch angle of blade 112 decreases a blade surface area 126 exposed to wind 124 and, conversely, decreasing a pitch angle of blade 112 increases blade surface area 126 exposed to wind 124.

For example, a blade pitch angle of approximately 0 degrees (sometimes referred to as a "power position") exposes a significant percentage of a blade surface area 126 to wind 124, thereby resulting in inducement of a first value of lift forces on blade 112. Similarly, a blade pitch angle of approximately 90 degrees (sometimes referred to as a "feathered position") exposes a significantly lower percentage of blade surface area 126 to wind 124, thereby resulting in inducement of a second value of lift forces on blade 112. The first value of lift forces induced on blades 112 is greater than the second value of lift forces induced on blades 112 such that values of lift forces are directly proportional to blade surface area 126 exposed to wind 124. Therefore, values of lift forces induced on blades 112 are indirectly proportional to values of blade pitch angle.

Also, for example, as blade lift forces increase, a linear speed of blade tip portion 125 increases. Conversely, as blade lift forces decrease, the linear speed of blade tip portion 125 decreases. Therefore, values of the linear speed of blade tip portion 125 are directly proportional to values of the lift forces induced on blades 112 and it follows that the linear speed of blade tip portion 125 is indirectly proportional to the blade pitch angle.

Moreover, as the linear speed of blade tip portion 125 increases, an amplitude (not shown) of acoustic emissions (not shown in FIG. 1) from blade 112 increases. Conversely, as the linear speed of blade tip portion 125 decreases, the amplitude of acoustic emissions from blades 112 decreases. Therefore, the amplitude of acoustic emissions from blades 112 is directly proportional to the linear speed of blade tip portions 125 and it follows that the amplitude of acoustic emissions from blades 112 is indirectly proportional to the blade pitch angle.

The pitch angles of blades 112 are adjusted about a pitch axis 118 for each blade 112. In the exemplary embodiment, the pitch angles of blades 112 are controlled individually. Alternatively, the pitch angles may be controlled as a group. Further, the pitch of the blades and the speed of the blades 112 may be modulated in order to reduce acoustic emissions. In one embodiment, wind turbine generator 100 may be controlled to reduce the potential acoustic emissions by a local controller (not shown), or remotely via a remote controller (not shown) to reduce noise.

Figure 2:
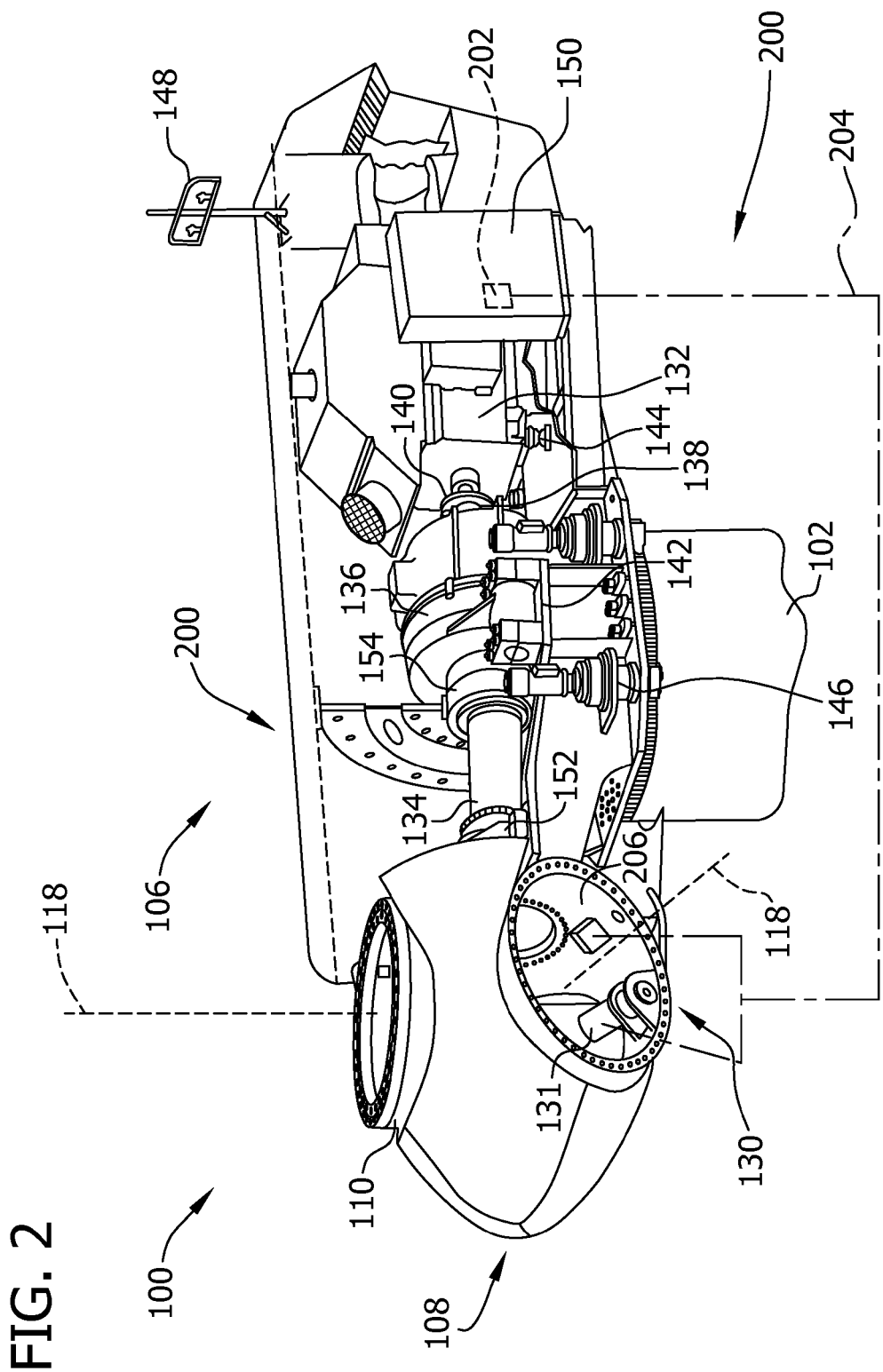
FIG. 2 is a partial cross-sectional schematic view of a nacelle used with the exemplary wind turbine generator shown in FIG. 1.

FIG. 2 is a cross-sectional schematic view of nacelle 106 of exemplary wind turbine generator 100. Various components of wind turbine generator 100 are housed in nacelle 106 atop tower 102 of wind turbine generator 100. Nacelle 106 includes one pitch drive mechanism 130 that is coupled to one blade 112 (shown in FIG. 1). Pitch drive mechanism 130 modulates the pitch of associated blade 112 along pitch axis 118. Only one of three pitch drive mechanisms 130 is shown in FIG. 2. In the exemplary embodiment, each pitch drive mechanism 130 includes at least one pitch drive motor 131. Pitch drive motor 131 is any electric motor driven by electrical power that enables pitch drive mechanism 130 to function as described herein. Alternatively, pitch drive mechanisms 130 include any suitable structure, configuration, arrangement, and/or components such as, but not limited to, hydraulic cylinders, springs, and servomechanisms. Moreover, pitch drive mechanisms 130 may be driven by any suitable means such as, but not limited to, hydraulic fluid, and/or mechanical power, such as, but not limited to, induced spring forces and/or electromagnetic forces.

Nacelle 106 also includes rotor 108 that is rotatably coupled to an electric generator 132 positioned within nacelle 106 via rotor shaft 134 (sometimes referred to as a low speed shaft), a gearbox 136, a high speed shaft 138, and a coupling 140. Rotation of rotor shaft 134 rotatably drives gearbox 136 that subsequently rotatably drives high speed shaft 138. High speed shaft 138 rotatably drives generator 132 via coupling 140 and high speed shaft 138 rotation facilitates production of electrical power by generator 132. Gearbox 136 and generator 132 are supported by supports 142 and 144, respectively. In the exemplary embodiment, gearbox 136 utilizes a multiple load path gear arrangement to drive high speed shaft 138. Alternatively, in direct drive configurations, main rotor shaft 134 is coupled directly to generator 132 via coupling 140.

Nacelle 106 further includes a yaw drive assembly 146 that may be used to rotate nacelle 106 and rotor 108 on axis 116

(shown in FIG. 1) to control the perspective of blades 112 with respect to the direction of wind 124, as described in more detail herein. Nacelle 106 also includes at least one meteorological mast 148. Mast 148 includes a wind vane and anemometer (neither shown in FIG. 2). Mast 148 provides information to a turbine control system (not shown) that may include wind direction and/or wind speed. A portion of the turbine control system resides within a control panel 150. Nacelle 106 further includes forward and aft support bearings 152 and 154, respectively. Support bearings 152 and 154 facilitate radial support and alignment of rotor shaft 134.

Wind turbine generator 100 includes a pitch control system 200. In one embodiment, at least a portion of pitch control system 200 is positioned in nacelle 106. Alternatively, at least a portion of pitch control system 200 is positioned outside nacelle 106. Specifically, at least a portion of pitch control system 200 described herein includes at least one processor 202 and a memory device (not shown), and at least one input/output (I/O) conduit 204, wherein conduit 204 includes at least one I/O channel (not shown). More specifically, processor 202 is positioned within control panel 150. Pitch control system 200 substantially provides a technical effect of wind turbine noise reduction as described herein.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may include without limitation computer peripherals associated with an operator interface, such as a mouse and a keyboard. Alternatively, other computer peripherals may also be used that may include, for example, without limitation, a scanner. Furthermore, in the exemplary embodiment, additional output channels may include, without limitation, an operator interface monitor.

Processor 202 and other processors (not shown) as described herein process information transmitted from a plurality of electrical and electronic devices that may include, without limitation, blade pitch position feedback devices 206 (described further below) and electric power generation feedback devices (not shown). RAM and storage devices (not shown) store and transfer information and instructions to be executed by processor 202. RAM and storage devices can also be used to store and provide temporary variables, static (i.e., non-changing) information and instructions, or other intermediate information to processor 202 during execution of instructions by processor 202. Instructions that are executed include, but are not limited to, resident blade pitch system 200 control commands. The execution of sequences of instructions is not limited to any specific combination of hardware circuitry and software instructions.

In the exemplary embodiment, at least a portion of pitch control system 200 including, but not limited to, processor 202 is positioned within control panel 150. Moreover, processor 202 is coupled to blade pitch drive motors 131 via at least one I/O conduit 204. I/O conduit 204 includes any number of channels having any architecture including, but not limited to, Cat 5/6 cable, twisted pair wiring, and wireless communication features. Pitch control system 200 may include distributed and/or centralized control architectures.

Pitch control system 200 also includes a plurality of independent blade pitch position feedback devices 206 coupled with processor 202 via at least one I/O conduit 204. In the exemplary embodiment, each pitch drive mechanism 130 is associated with a single blade pitch position feedback device 206. Alternatively, any number of blade pitch position feedback devices 206 are associated with each pitch drive mechanism 130. Therefore, in the exemplary embodiment, pitch drive mechanism 130 and associated drive motor 131, as well as blade pitch position feedback device 206, are included in system 200 as described herein. Each blade pitch position feedback device 206 measures a pitch position of each blade 112, or more specifically an angle of each blade 112 with respect to wind 124 (shown in FIG. 1) and/or with respect to rotor hub 110. Blade pitch position feedback device 206 is any suitable sensor having any suitable location within or remote to wind turbine generator 100, such as, but not limited to, optical angle encoders, magnetic rotary encoders, and incremental encoders, or some combination thereof. Moreover, blade pitch position feedback device 206 transmits pitch measurement signals (not shown) that are substantially representative of associated blade 112 pitch position to processor 202 for processing thereof.

Figure 3:
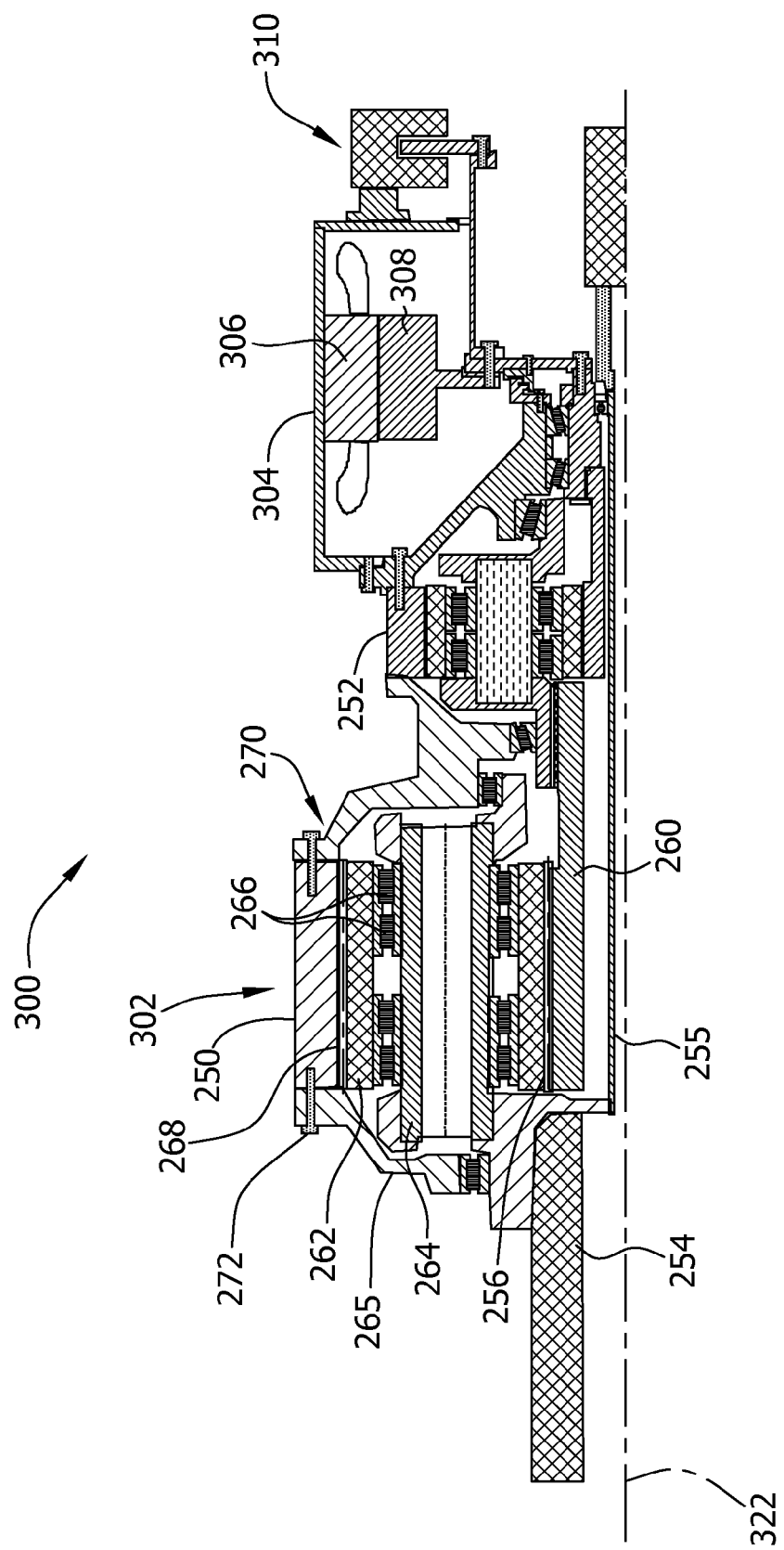
FIG. 3 is a cross-sectional schematic view of an exemplary gearbox that may be used with the exemplary wind turbine generator shown in FIG. 1.
Figure 4:
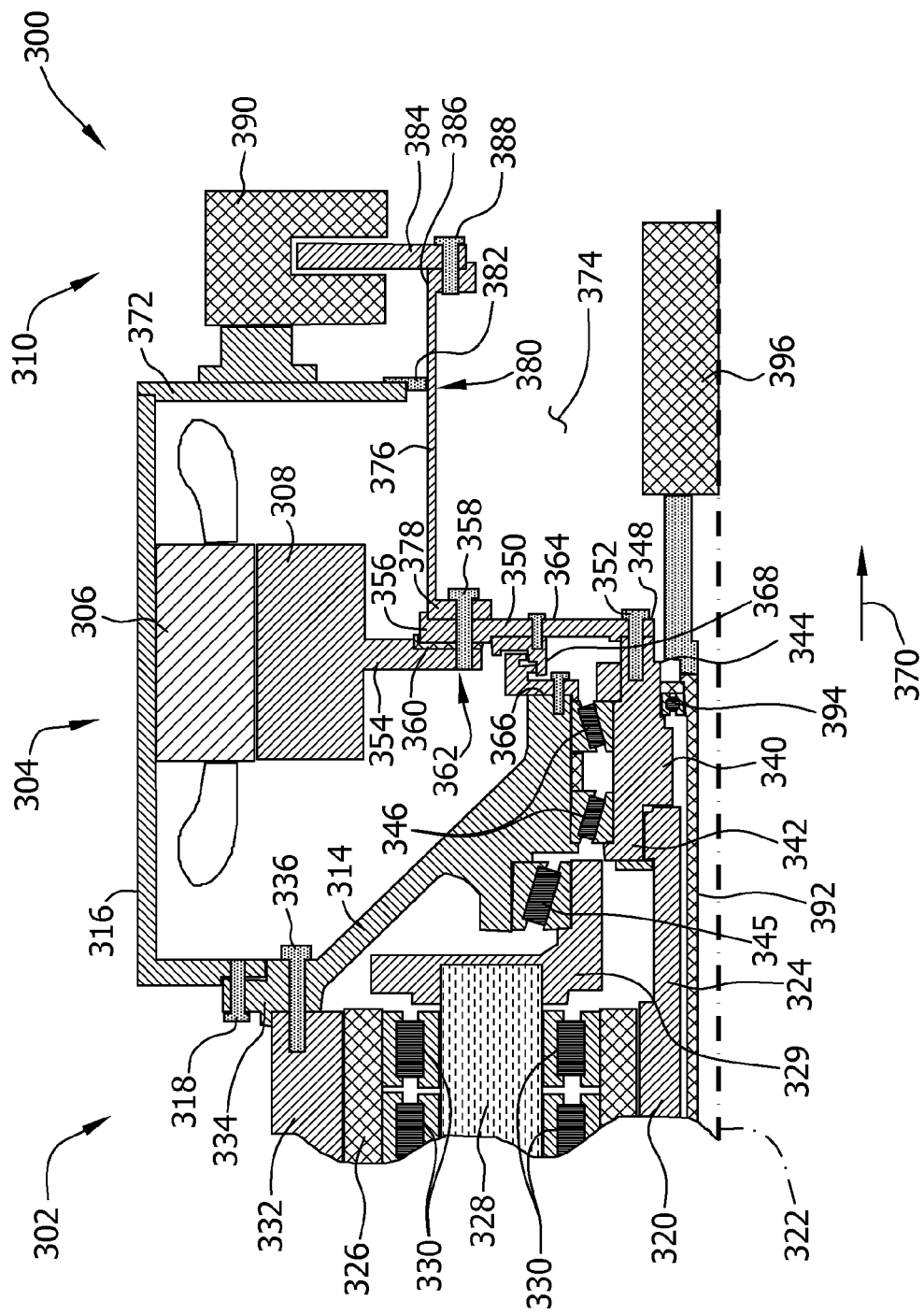
FIG. 4 is a cross-sectional schematic view of an exemplary drivetrain that may be used with the exemplary wind turbine generator shown in FIG. 1.

FIGS. 3 and 4 are cross-sectional schematic views of an exemplary drivetrain 300 that may be used with exemplary wind turbine generator 100 shown in FIG. 1. In the exemplary embodiment, drivetrain 300 includes a gearbox 302 that is operatively coupled to a generator 304 having a stator 306, a rotor 308 and a braking system 310 that facilitates stopping the rotation of wind turbine generator 100 (shown in FIG. 1). Gearbox 302 includes a first gear stage 250 operatively coupled to a second gear stage 252 via a central turbine rotor shaft 254 and a pitch tube 255 combination. In the exemplary embodiment and as shown in FIG. 3, first gear stage 250 includes a sun pinion 256 that rotates about an axis of rotation 322. Sun pinion 256 includes a sun pinion shaft 260 that provides a mechanical input to generator 304. A plurality of planetary gears 262 engage sun pinion 256 and rotate about a planet carrier 264 via a plurality of gearbox planetary bearings 266. Planet carrier 264 is rigidly housed within a first gear stage housing 265. Each planetary gear 262 engages a ring gear 268 that is fixedly coupled to a radially outer portion 270 of housing 265 via a plurality of fasteners 272.

In the exemplary embodiment, second gear stage includes a housing 314 that is coupled to a generator stator housing 316 via a plurality of fasteners 318. Stator 306 is positioned radially inward of housing 306. Second gear stage includes a sun pinion 320 that rotates about an axis of rotation 322. Sun pinion 320 includes a sun pinion shaft 324 that provides a mechanical input to generator 304, as described in more detail herein. A plurality of planetary gears 326 engage sun pinion 320 and rotate about planet carrier pins 328 via a plurality of gearbox planetary bearings 330. The planet carrier pins 328 are rigidly housed in a planet carrier 329 which rotates about the gearbox carrier bearing 345. Each planetary gear 326 engages a ring gear 332 that is fixedly coupled to a radially outer portion 334 of housing 314 via a plurality of fasteners 336. Alternatively, drivetrain 300 includes any type of gearbox and arrangement of sun and planetary gear combinations that enable wind turbine generator 100 to function as described herein, such as a compound planetary, a dual-planetary, and an epicyclical gearbox. In a further alternative embodiment, gearbox bearing 330 may include any type of bearings including, but not limited to, cylindrical, spherical, tapered and ball bearings.

Drivetrain 300 includes a gearbox output shaft 340 having a first end 342 and a second end 344. In the exemplary embodiment, gearbox output shaft 340 is coupled to sun pinion shaft 324 at first end 342 and rotates about axis of rotation 322 within housing 314 via a plurality of generator bearings 346. Gearbox output shaft second end 344 is coupled to a radially inner portion 348 of a substantially arcuate coupling disk 350 via a plurality of fasteners 352. Rotor 308 includes a radially inwardly-extending spider 354 that is coupled to a radially outer portion 356 of coupling disk 350 via a plurality of insulated bolts 358. An insulating ring 360 is positioned between coupling disk 350 and spider 354 to form a substantially insulated rotor joint 362. A center portion 364 of coupling disk 350 is positioned adjacent to an aft surface 366 of gearbox housing 314. In the exemplary embodiment, a labyrinth seal 368 is positioned between aft surface 366 and coupling disk center portion 364 to facilitate rotation of coupling disk 350 during wind turbine generator 100 operation.

During wind turbine generator operation, insulated rotor joint 362 protects the generator bearings 346 and gearbox bearings 345 and 330 from harmful electrical voltages and currents by increasing the impedance in the path to the bearings for high-frequency common-mode induced voltages and currents from power electronic converters (not shown) connected to the generator stator 306.

In the exemplary embodiment, braking system 310 extends in an aft direction 370 from generator 304. More specifically and in the exemplary embodiment, stator housing 316 includes an aft wall 372 defining an aperture 374 therethrough that is substantially centered about axis of rotation 322. Braking system 310 includes a substantially cylindrical torque tube 376 that is coupled at a first end 378 to coupling disk outer portion 356 via insulating bolts 358. Torque tube 376 extends in the aft direction 370 through aperture 374 such that a portion 380 of torque tube 376 is positioned proximate to aft wall 372. In the exemplary embodiment, a dust seal 382 is coupled to aft wall 372 about aperture 374 and extends radially inward therefrom to abut torque tube 376 and substantially prevent contaminates from entering generator 304 through aperture 374.

In the exemplary embodiment, braking system 310 includes a brake disk 384 that is fixedly coupled to a second end 386 of torque tube 376 via a plurality of fasteners 388. In the exemplary embodiment, braking system 310 includes at least one brake caliper 390 that is coupled to aft wall 372 and is sized and oriented to receive a portion of brake disk 384 therein. An integrated gearbox/generator unit reduces an overall size and weight of the drivetrain by eliminating unused space within generator stator housing 316. Such a design also allows for generator bearing 346 to be contained within gearbox 302, and facilitate sharing lubricant that is required for proper functionality of bearings 330 and 346.

In the exemplary embodiment, fasteners 318, 336, 352, 358 and 388 are nut/bolt combinations. Alternatively, fasteners 318, 336, 352, 358 and 388 may be any fastening device that enables drivetrain 300 to function as described herein, such as for example, a welded joint, a screw and/or a rivet, or any combination thereof.

In the exemplary embodiment, a pitch tube 392 extends the length of gearbox 302 and generator 304, and houses power and control wiring (not shown) that extends from blade pitch drive mechanisms 130 to control panel 150, thereby providing a physical location for I/O conduit 204. A pitch tube bearing 394 provides support while enabling rotation of pitch tube 392. A slip ring assembly 396 is coupled to an aft end of pitch tube 392, and provides an electrical connection for the wiring housed within pitch tube 392.

The operation of the embodiments illustrated in FIGS. 5-12 is similar to the embodiment shown in FIGS. 3 and 4 and described herein, and similar to alternative embodiments discussed herein. Therefore, like components in FIGS. 5-12 are similarly numbered therein.

Figure 5:
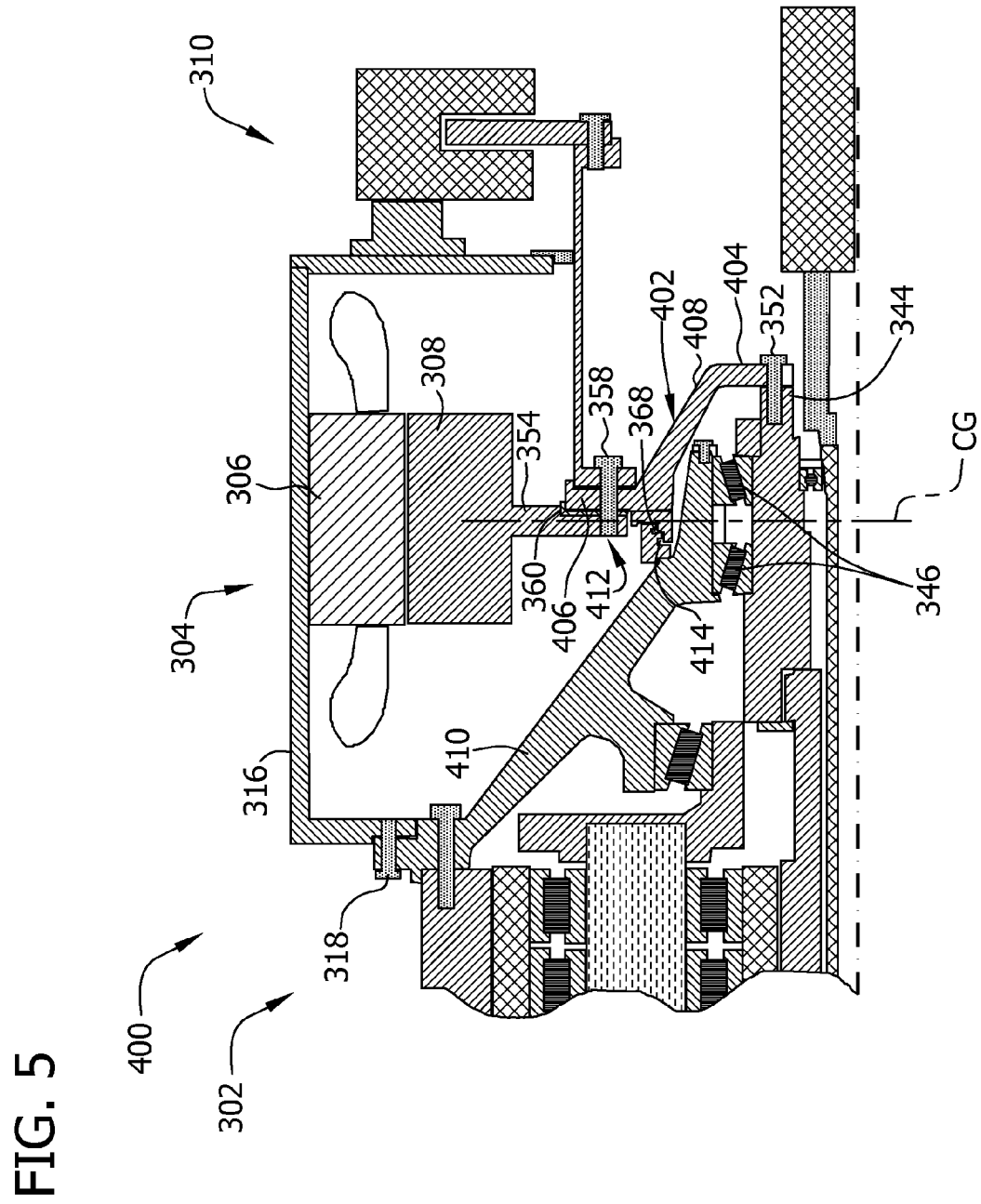
FIG. 5 is a cross-sectional schematic view of an alternative drivetrain that may be used with the exemplary wind turbine generator shown in FIG. 1.

FIG. 5 is a cross-sectional schematic view of an alternative drivetrain 400 that may be used with wind turbine generator 100 shown in FIG. 1. Drivetrain 400 is similar to drivetrain 300, but may additionally incorporate a substantially conical coupling disk 402 to further reduce an overall size and weight of drivetrain 400, as described in more detail herein. More specifically, conical coupling disk 402 includes a radially inner portion 404, a radially outer portion 406 that extends substantially parallel to inner portion 404, and a conical portion 408 extending between inner portion 404 and outer portion 406.

In the exemplary embodiment, drivetrain 400 includes a gearbox 302 that is operatively coupled to a generator 304 having a stator 306, a rotor 308 and a braking system 310 that facilitates stopping the rotation of wind turbine generator 100 (shown in FIG. 1). More specifically and in the exemplary embodiment, drivetrain 400 includes a planetary gearbox 302 having an extended housing 410 that is coupled to a generator stator housing 316 via a plurality of fasteners 318. Gearbox output shaft second end 344 is coupled to inner portion 404 via a plurality of fasteners 352. Rotor 308 includes a radially inwardly-extending spider 354 that is coupled to outer portion 406 via a plurality of insulated bolts 358. An insulating ring 360 is positioned between outer portion 406 and spider 354 to form a substantially insulated rotor joint 412. Outer portion 406 is positioned adjacent to a surface 414 of gearbox housing 410. In the exemplary embodiment, a labyrinth seal 368 is positioned between surface 414 and outer portion 406 to facilitate rotation of coupling disk 402 during wind turbine generator 100 operation.

Drivetrain 400 provides an integrated gearbox/generator unit that enables a generator rotor center of gravity (CG) to be substantially axially aligned with generator bearings 346. Such a design facilitates reducing loads exerted on generator bearings 346 during operation and further facilitates increasing an operational life and cost of generator bearings 346.

Figure 6:
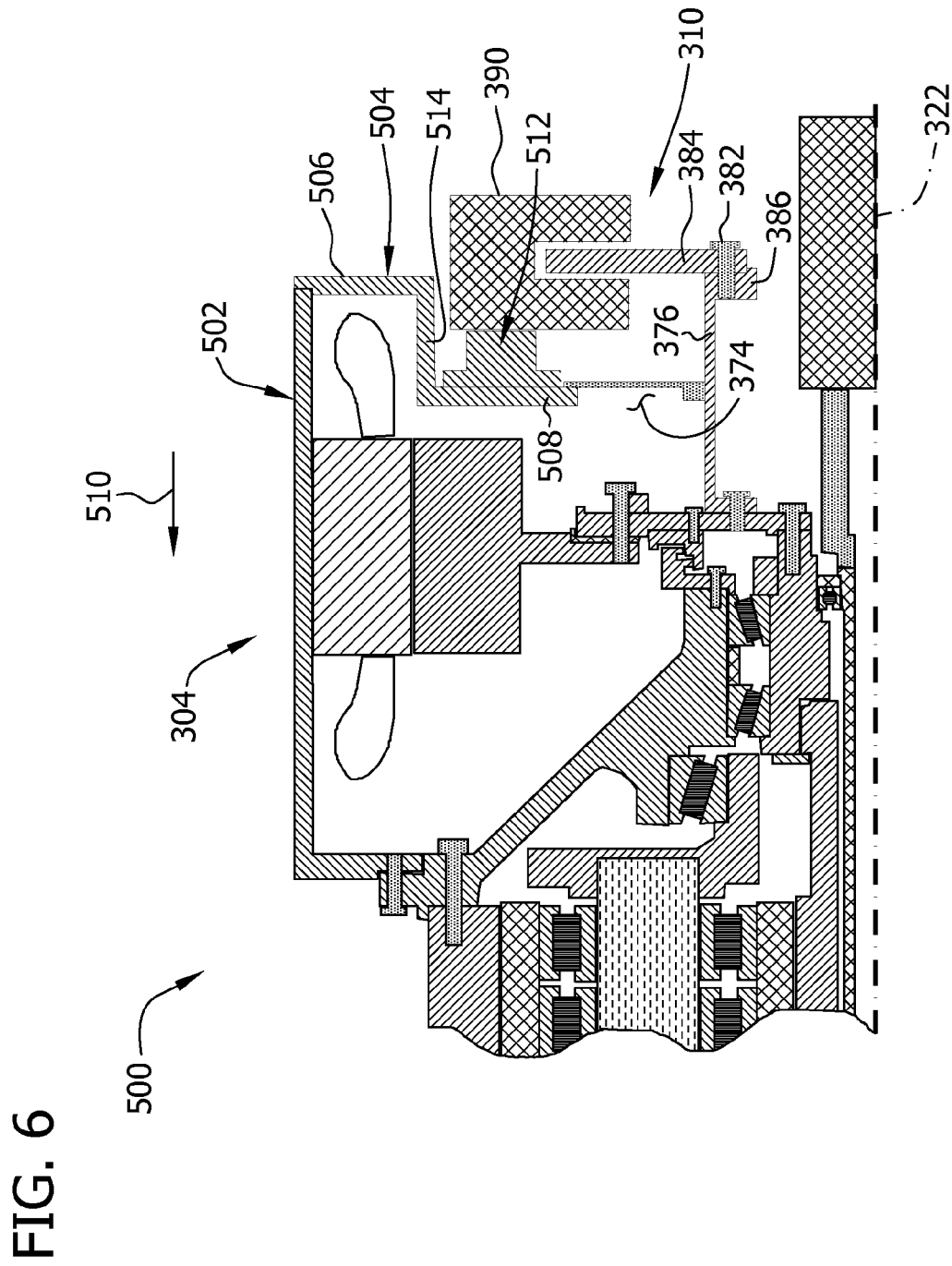
FIG. 6 is a cross-sectional schematic view of an alternative drivetrain that may be used with the exemplary wind turbine generator shown in FIG. 1.

FIG. 6 is a cross-sectional schematic view of an alternative drivetrain 500 that may be used with exemplary wind turbine generator 100 shown in FIG. 1. Drivetrain 500 is similar to drivetrain 300, but may additionally incorporate an offset stator housing 502 to further reduce an overall size and weight of drivetrain 500, as described in more detail herein.

In the illustrated alternative embodiment, offset stator housing 502 includes an aft wall 504 defining an aperture 374 therethrough that is substantially centered about axis of rotation 322. Aft wall 504 includes a first portion 506, a second portion 508 that is axially offset in a forward direction 510 from first portion 506 and that defines a recess 512 in aft wall 504, and a third portion 514 that extends between first portion 506 and second portion 508.

Braking system 310 includes a brake disk 384 that is fixedly coupled to an end 386 of a torque tube 376 via a plurality of fasteners 388, as described herein. In the illustrated alternative embodiment, braking system 310 includes a brake caliper 390 that is coupled to second portion 508 of aft wall 504 and that is sized and oriented to receive a portion of brake disk 384, as described herein. In a further alternative embodiment, brake caliper 390 may be coupled to third portion 514, or may be couple to aft wall 504 in any configuration that enables braking system 310 to function as described herein.

Drivetrain 500 provides an integrated gearbox/generator unit that enables the use of a shorter torque tube 376 compared to conventional designs. Such a design facilitates further reducing an overall size and weight of drivetrain 500 by increasing a compactness of offset stator housing 502 and eliminating unused space within generator 304. The design also reduces the overhanging mass on generator bearings 346 and facilitates increased dynamic stiffness, thereby increasing operational life and cost of generator bearings 346 and improving overall dynamic response.

Figure 7:
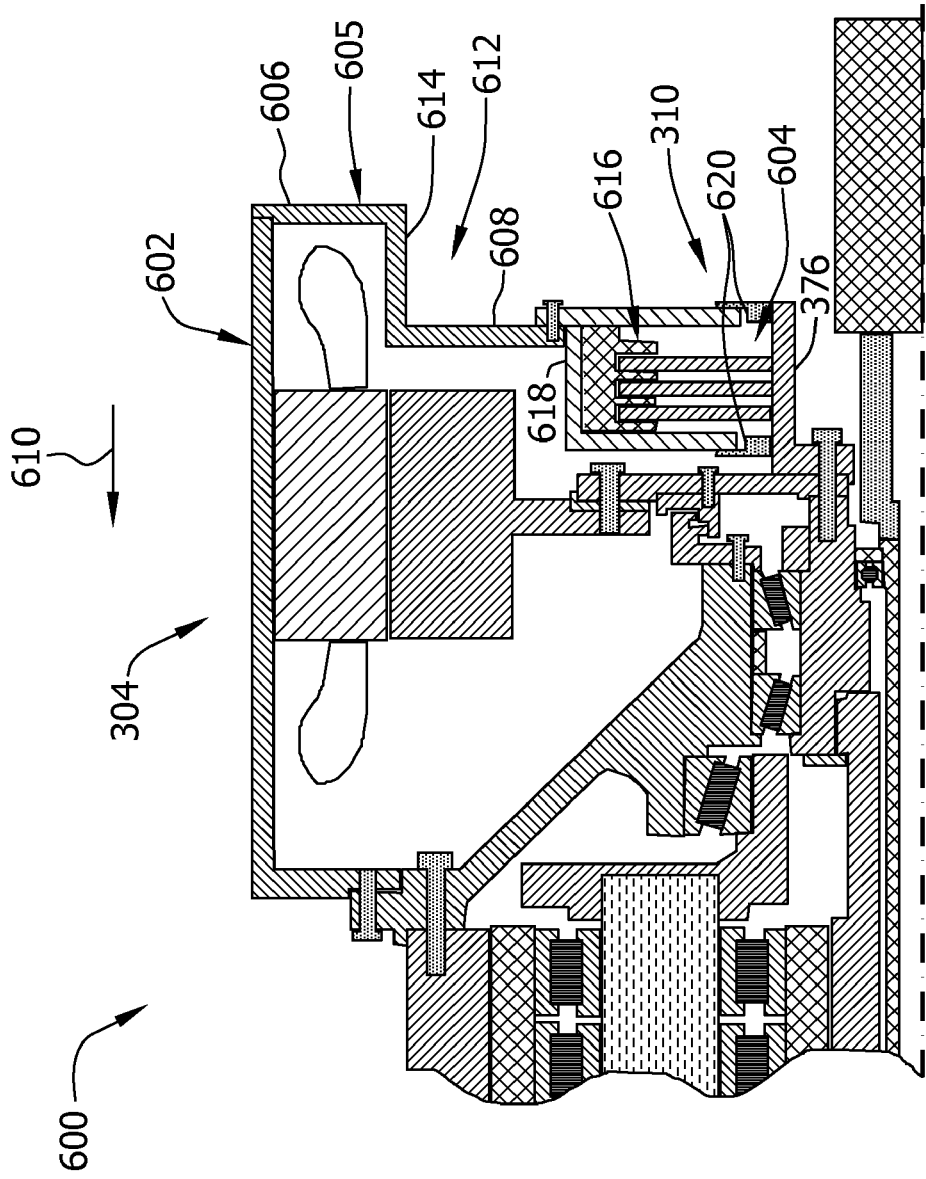
FIG. 7 is a cross-sectional schematic view of an alternative drivetrain that may be used with the exemplary wind turbine generator shown in FIG. 1.

FIG. 7 is a cross-sectional schematic view of an alternative drivetrain 600 that may be used with exemplary wind turbine 100 generator shown in FIG. 1. Drivetrain 600 is similar to drivetrain 300, but may additionally incorporate an offset stator housing 602 to further reduce an overall size and weight of drivetrain 600, and a plurality of brake disks 604 to facilitate enhancing the braking capabilities of braking system 310.

In the illustrated alternative embodiment, offset stator housing 602 includes an aft wall 605 having a first portion 606, a second portion 608 that is axially offset in a forward direction 610 from first portion 606 and that defines a recess 612 in aft wall 605, and a third portion 614 that extends between first portion 606 and second portion 608. Braking system 310 includes brake disks 604 that are fixedly coupled to a torque tube 376, as described herein. A plurality of brake calipers 616 received within a caliper housing 618 is coupled to, and that extends radially inward from, second portion 608. Caliper housing 618 is sized and oriented to receive brake disks 604 therein, such that braking system 310 functions as described herein. In the illustrated alternative embodiment, a plurality of dust seals 620 are coupled to caliper housing 618 and extend radially inward therefrom to abut torque tube 376 and substantially prevent contaminates from entering generator 304.

Drivetrain 600 provides an integrated gearbox/generator unit that enables the use of a shorter torque tube 376. Such a design facilitates further reducing an overall size and weight of drivetrain 600 by increasing compactness of offset stator housing 602 and eliminating unused space within generator 304. In the illustrated embodiment, brake calipers 616 and brake disks 604 enable the brake disk diameters to be substantially reduced compared to the single brake disk/caliper system of drivetrains 300, 400 and 500 for the equivalent braking effectiveness, thereby enabling brake system 310 to be located in the previously unoccupied space within generator 304. Alternatively, recess 612 is optional and may be removed, thereby eliminating third portion 614 and combining of portions 606 and 608. Consequentially, torque tube 376 may be extended and the compactness of drivetrain 600 would be further reduced.

Figure 8:
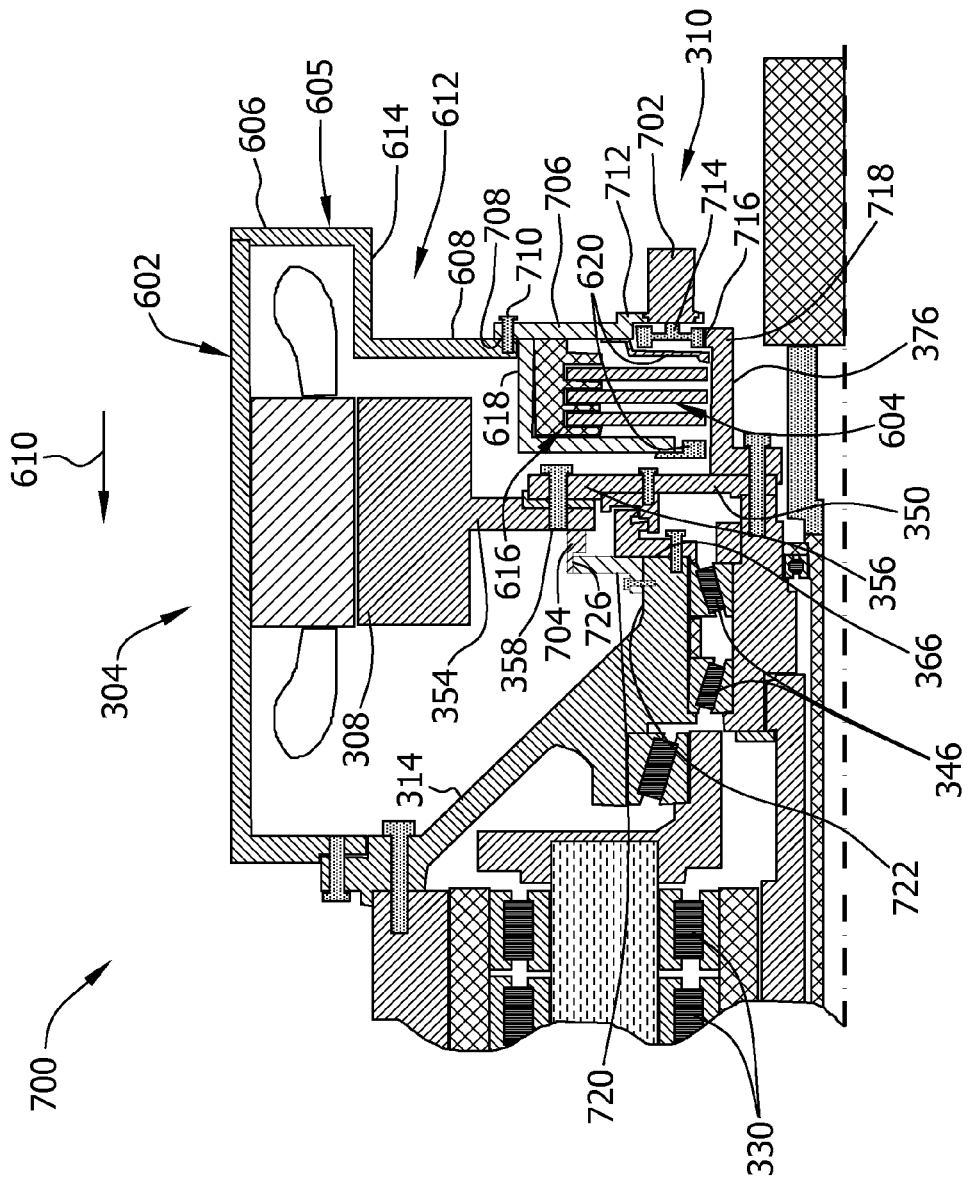
FIG. 8 is a cross-sectional schematic view of an alternative drivetrain that may be used with the exemplary wind turbine generator shown in FIG. 1.

FIG. 8 is a cross-sectional schematic view of an alternative drivetrain 700 that may be used with the exemplary wind turbine generator shown in FIG. 1. Drivetrain 700 is similar to drivetrain 600, but may additionally incorporate an encoder 702 to facilitate enhancing control system functionality of wind turbine generator 100 and a grounding brush 704 to further protect generator bearings 346 and gearbox bearing 330 and 345 from harmful electrical voltages and currents.

More specifically and in the illustrated alternative embodiment, offset stator housing 602 includes an aft wall 605 having a first portion 606, a second portion 608 that is axially offset in a forward direction 610 from first portion 606 and that defines a recess 612 in aft wall 605, and a third portion 614 that extends between first portion 606 and second portion 608. Braking system 310 includes caliper housing 618 having a first wall 706 that is coupled to second portion 608 at a joint 708 using a fastener 710, and extends radially inward from joint 708. Encoder 702 is coupled to a radially inner end 712 of first wall 706 and includes an encoder gear 714 that is sized and oriented to engage a plurality of gear teeth 716 included on an axially aft end 718 of torque tube 376. During operation, rotation of torque tube 376 transmits mechanical energy through gear teeth 716 to facilitate providing rotational power to encoder 702.

Rotor 308 includes a radially inwardly-extending spider 354 that is coupled to a radially outer portion 356 of coupling disk 350 via a plurality of insulated bolts 358, as described in more detail herein. In the illustrated alternative embodiment, a substantially L-shaped support 720 is coupled to a radially outer surface 722 of gearbox housing 314 adjacent to aft surface 366. Grounding brush 704 is coupled to a radially outer portion 726 of L-shaped support 720 and is sized and oriented to engage spider 354 to facilitate providing an electrical connection from rotor 308 to ground (not shown in FIG. 8) via gearbox housing 314. More specifically, grounding brush 704 provides a short circuit path around bearings 346. In a further alternative embodiment, support 720 may be coupled at any position and/or to any component, and support 720 may have any shape and/or any size that enables grounding brush 704 to function as described herein. In the illustrated alternative embodiment, a plurality of dust seals 620 are coupled to caliper housing 618 and extend radially inward therefrom to abut torque tube 376 and substantially prevent contaminates from entering generator 304, as described in more detail herein.

During wind turbine generator 100 operation, encoder 702 determines a position and a velocity of rotor 308 and transmits the determined position and velocity data to a power electronic converter (not shown in FIG. 8) and to other wind turbine controls. Moreover, grounding brush 704, in conjunction with insulated joint 362, provides an electrical connection from rotor 308 to ground via gearbox housing 314. Such a configuration facilitates maintaining a substantially low voltage across generator bearings 346 and gearbox bearings 330 and 345, thereby protecting the bearings from potentially harmful electrical bearing currents.

Figure 9:
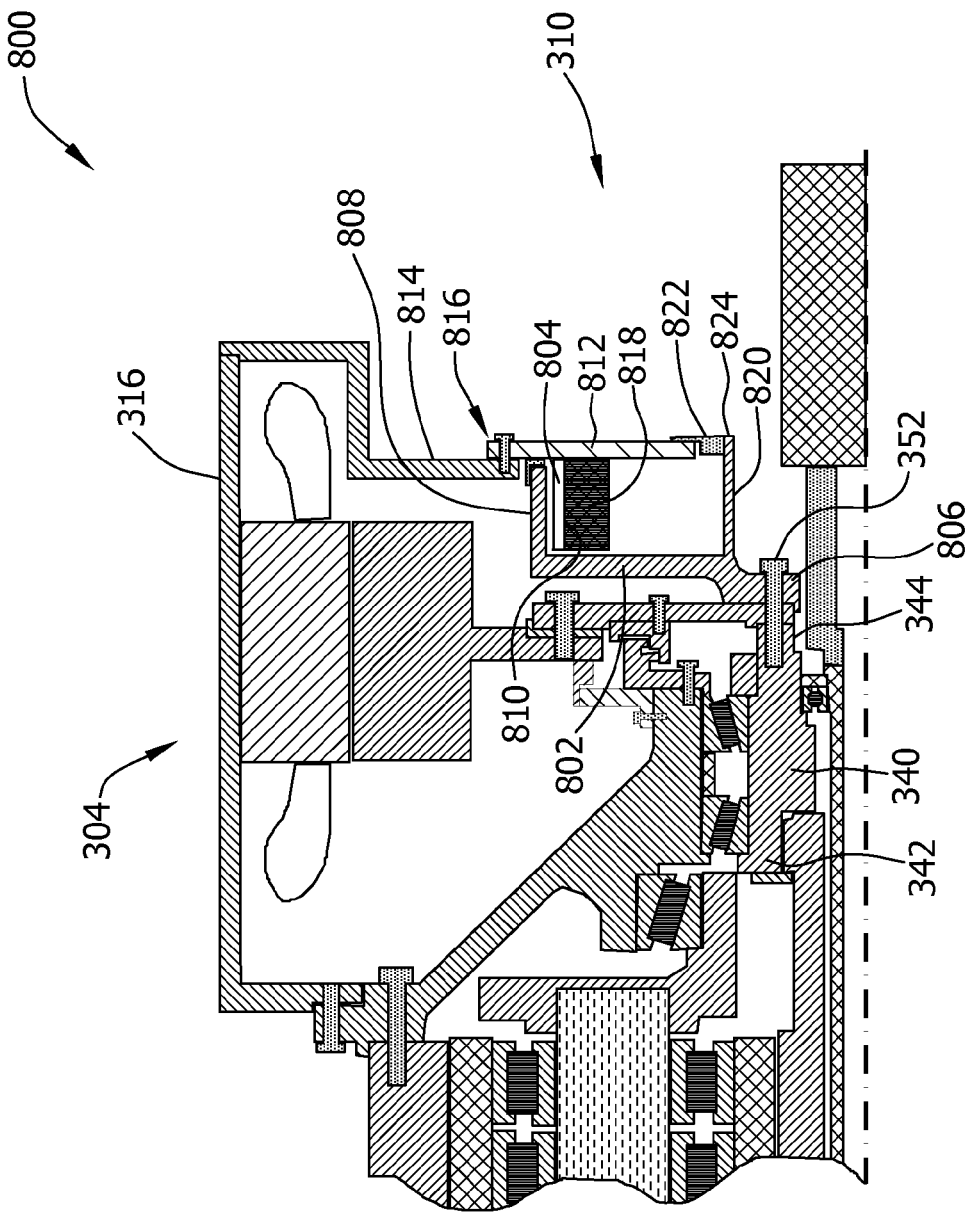
FIG. 9 is a cross-sectional schematic view of an alternative drivetrain that may be used with the exemplary wind turbine generator shown in FIG. 1.

FIG. 9 is a schematic cross-sectional view of an alternative drivetrain 800 that may be used with exemplary wind turbine generator 100 shown in FIG. 1. Drivetrain 800 is similar to drivetrain 300, but may additionally incorporate a brake drum 802 and a brake shoe 804 instead of brake disk 384 and brake caliper 390 shown in FIG. 4.

Drivetrain 800 includes a gearbox output shaft 340 having a first end 342 and a second end 344 as described herein. In the illustrated alternative embodiment, braking system 310 includes a brake drum 802 having a radially inner surface 806 that is coupled to second end 344 via fasteners 352. Brake drum 802 extends radially outward from inner surface 806 to an axially extending braking flange 808 that includes an inner braking surface 810. An actuator support 812 is coupled to an aft wall 814 of stator housing 316 at a joint 816 and extends radially inward from joint 816 and is positioned adjacent to braking flange 808.

In the illustrated alternative embodiment, a hydraulic actuator 818 is coupled to actuator support 812. At least one brake shoe 804 is operatively coupled to hydraulic actuator 818 and is sized and oriented to engage inner braking surface 810 during braking operations. Alternatively, actuator 818 may be any type of actuator that enables braking system 310 to function as described herein, such as a pneumatic, mechanical and/or electric actuator, or any combination thereof.

In the illustrated alternative embodiment, a flange 820 positioned radially inward from braking flange 808 extends axially aft from brake drum inner surface 806. A dust seal 822 is coupled to an end 824 of flange 820 and extends radially outward therefrom to abut actuator support 812 and substantially prevent contaminates from entering or exiting generator braking system 310.

Figure 10:
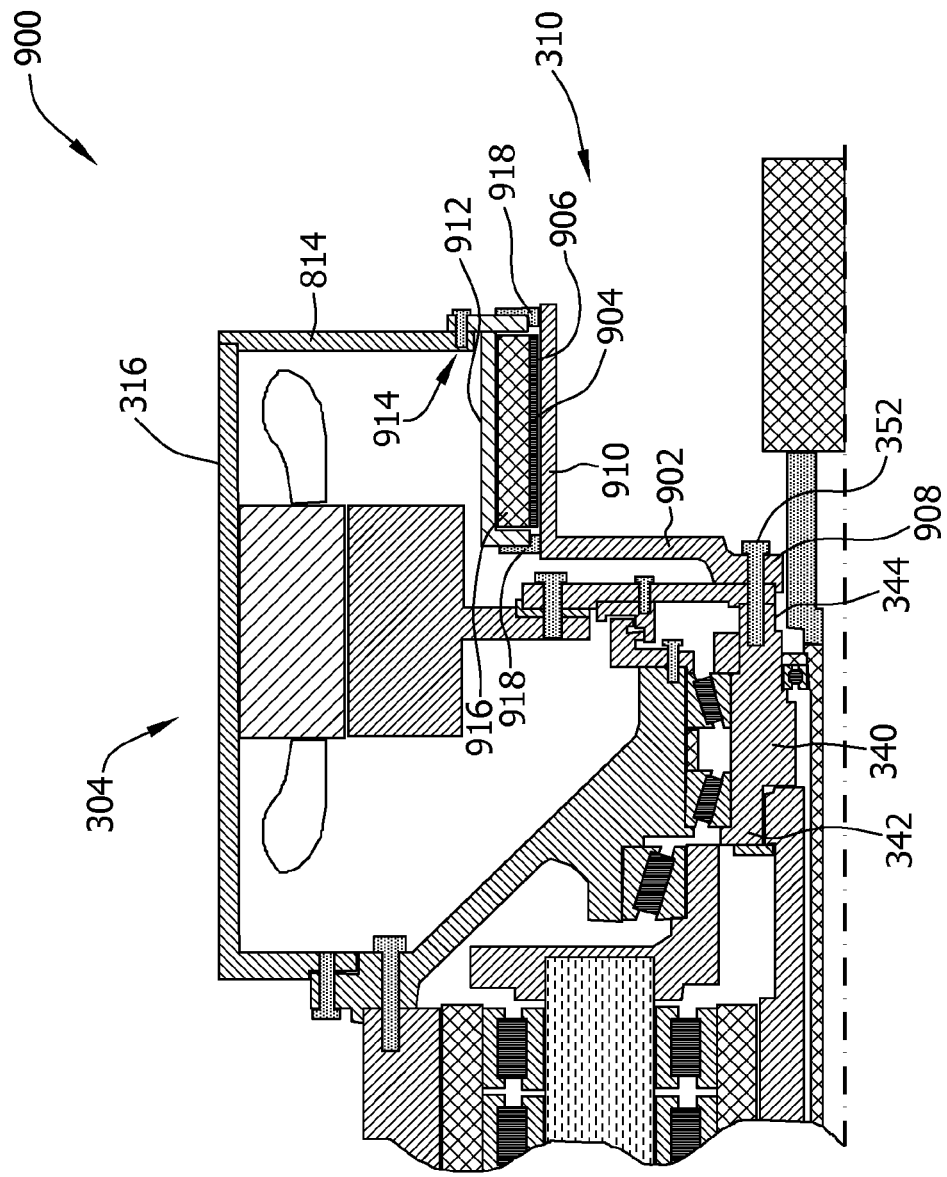
FIG. 10 is a cross-sectional schematic view of an alternative drivetrain that may be used with the exemplary wind turbine generator shown in FIG. 1.

FIG. 10 is a schematic cross-sectional view of an alternative drivetrain 900 that may be used with exemplary wind turbine generator 100 shown in FIG. 1. Drivetrain 900 is similar to drivetrain 800, but may additionally incorporate a brake drum 902 that includes an outer braking surface 904, and a brake shoe 906 that is positioned external from brake drum 902 to facilitate braking generator 304 during braking operations.

Drivetrain 900 includes a gearbox output shaft 340 having a first end 342 and a second end 344 as described herein. In the illustrated alternative embodiment, braking system 310 includes a brake drum 902 having a radially inner surface 908 that is coupled to second end 344 via fasteners 352. Brake drum 902 extends radially outward from inner surface 908 to an axially extending braking flange 910 that includes outer braking surface 904. An actuator housing 912 is coupled to aft wall 814 of stator housing 316 at a joint 914 and extends radially inward from joint 914 and is positioned adjacent to braking flange 910.

In the illustrated alternative embodiment, a hydraulic actuator 916 is received within actuator housing 912. At least one brake shoe 906 is operatively coupled to hydraulic actuator 916 and is sized and oriented to engage outer braking surface 904 during braking operations. Alternatively, actuator 916 may be any type of actuator that enables braking system 310 to function as described herein, such as a pneumatic, mechanical and/or electric actuator, or any combination thereof. One or more dust seals 918 are coupled to actuator housing 912 and extend radially inward therefrom to abut braking flange 910 and substantially prevent contaminates from entering or exiting braking system 310, and possibly entering generator 304.

During wind turbine generator 100 operation, drivetrains 800 and 900 provide for an integrated gearbox/generator unit that facilitates further reducing an overall size and weight of drivetrains 800 and 900 by increasing compactness of stator housing 316 and eliminating unused space within stator housing 316. Further, the use of a drum/shoe combination offers another alternative design choice for wind turbine generator braking operation.

Figure 11:
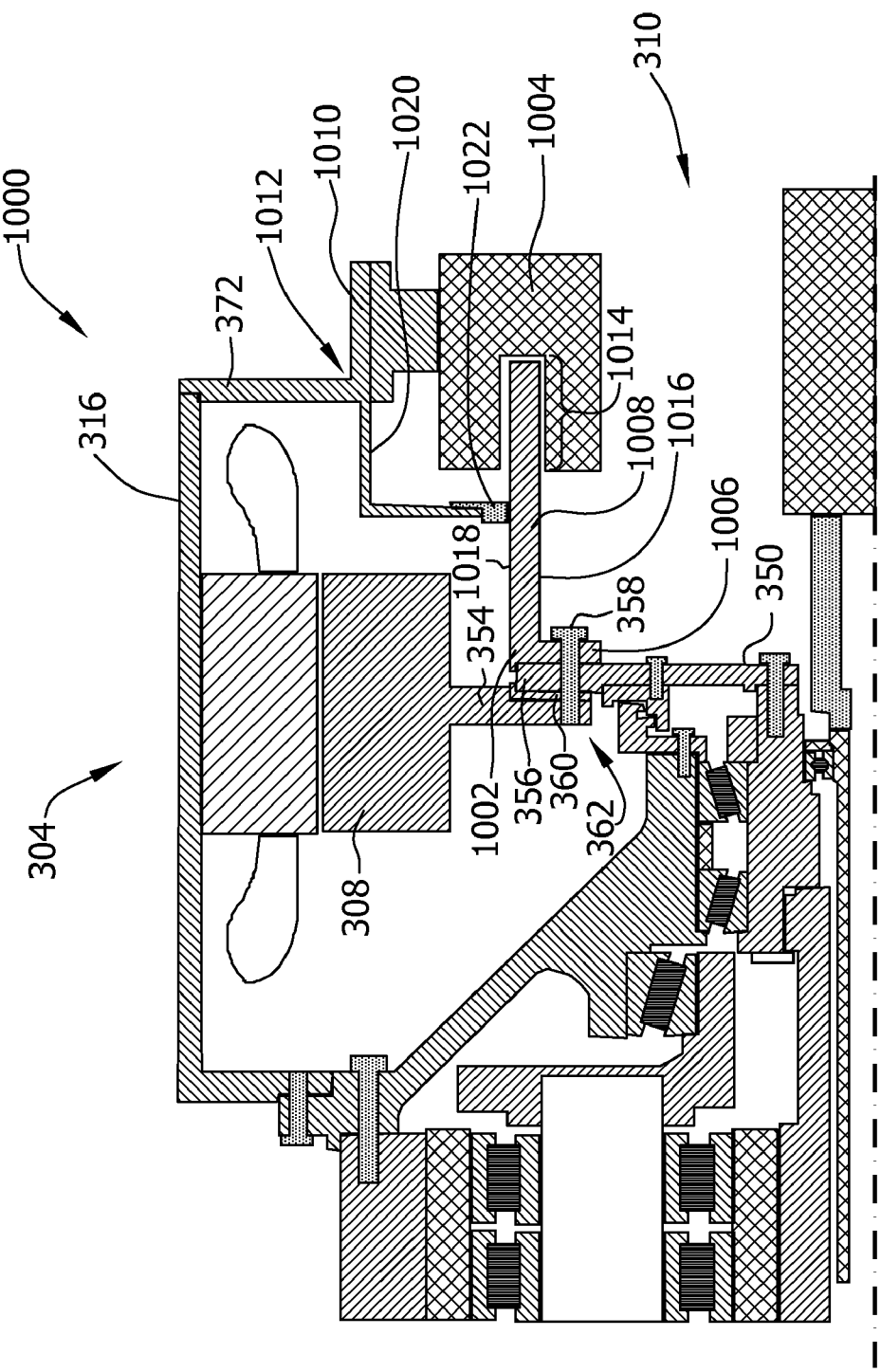
FIG. 11 is a cross-sectional schematic view of an alternative drivetrain that may be used with the exemplary wind turbine generator shown in FIG. 1.

FIG. 11 is a schematic cross-sectional view of an alternative drivetrain 1000 that may be used with exemplary wind turbine generator 100 shown in FIG. 1. Drivetrain 1000 is similar to drivetrain 300, but may additionally incorporate a brake drum 1002 and a caliper 1004 to facilitate braking generator 304 during braking operations.

As described herein, rotor 308 includes a radially inwardly-extending spider 354 that is coupled to a radially outer portion 356 of coupling disk 350 via a plurality of insulated bolts 358. An insulating ring 360 is positioned between coupling disk 350 and spider 354 to form a substantially insulated rotor joint 362. In the illustrated alternative embodiment, braking system 310 includes brake drum 1002 having a radially-extending support element 1006 and an axially extending braking element 1008 arranged in a substantially L-shaped configuration. Brake drum 1002 is coupled via support element 1006 to coupling disk 350 using insulated bolt 358 such that braking element 1008 extends aft therefrom.

In the illustrated alternative embodiment, stator housing 316 includes aft wall 372 having a flange 1010 that extends axially aft from a radially inner portion 1012 of aft wall 372. Caliper 1004 is fixedly coupled to flange 1010 and is oriented to receive at least a portion 1014 of braking element 1008 therein. In the illustrated alternative embodiment, braking element 1008 includes an inner braking surface 1016 and an outer braking surface 1018 that are used by caliper 1004 to brake wind turbine generator 100 during braking operations. Alternatively, braking element 1008 may include either inner braking surface 1016 or outer braking surface 1018 for use as described herein.

In the illustrated alternative embodiment, braking system 310 includes a dust seal support element 1020 that extends from aft wall 372 and is sized and oriented to maintain a dust seal 1022 in contact with outer braking surface 1018 to substantially prevent contaminates from entering generator braking system 310.

Figure 12:
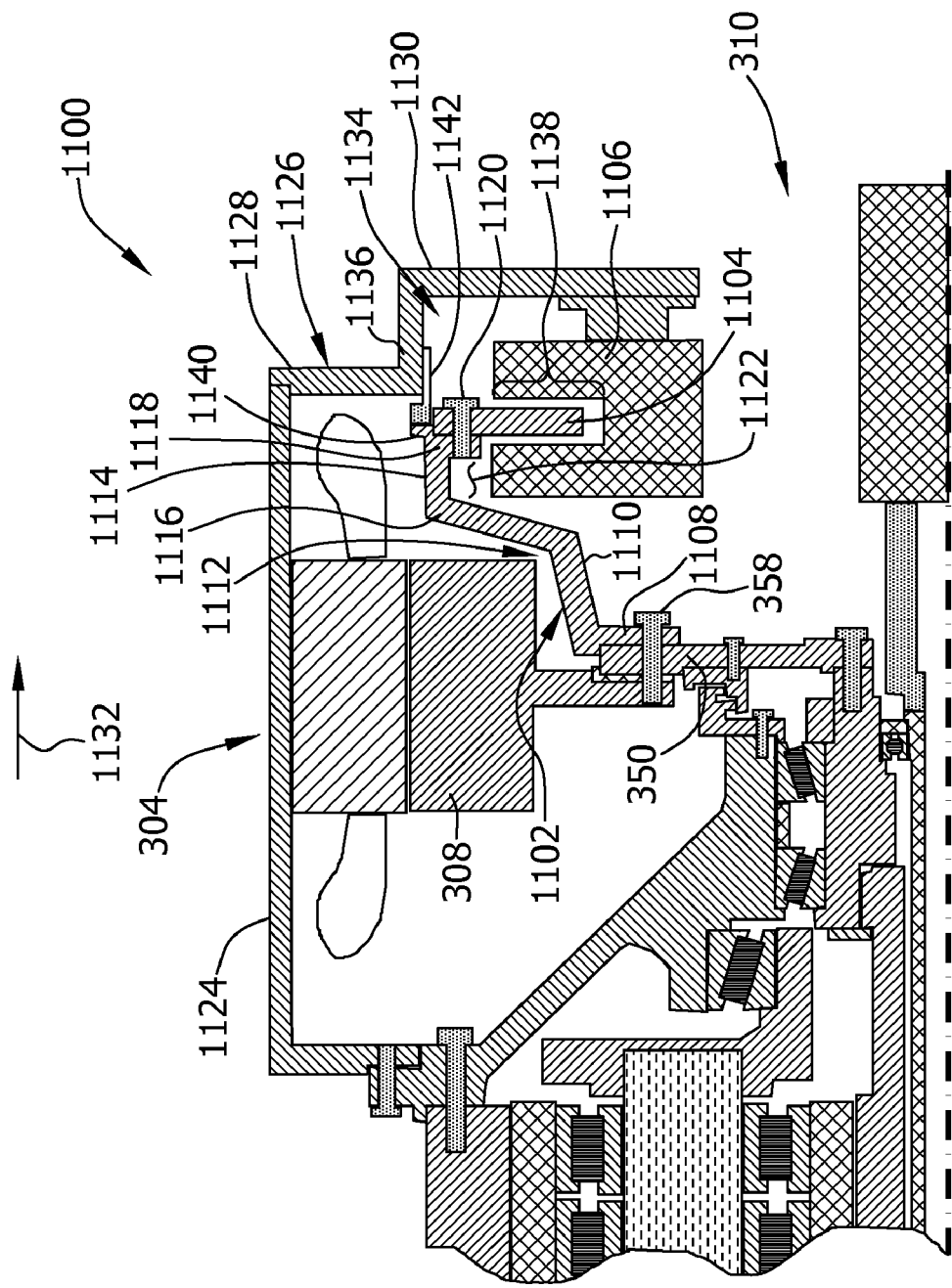
FIG. 12 is a cross-sectional schematic view of an alternative drivetrain that may be used with the exemplary wind turbine generator shown in FIG. 1.

FIG. 12 is a schematic cross-sectional view of an alternative drivetrain 1100 that may be used with exemplary wind turbine generator 100 shown in FIG. 1. Drivetrain 1100 is similar to drivetrain 300, but may additionally incorporate a substantially conical torque tube 1102 such that a brake disk 1104 is coupled to torque tube 1102 and extends substantially radially inward therefrom, and a caliper 1106 that is oriented to receive brake disk 1104 therein.

More specifically and in the illustrated alternative embodiment, conical torque tube 1102 includes a first section 1108 that is coupled to coupling disk 350 via insulated bolts 358. Conical torque tube 1102 includes a second angled section 1110 that extends obliquely around rotor 308 and is sized and oriented such that a space 1112 is defined between angled section 1110 and rotor 308 to prevent additional heating of generator rotor 308 during braking operations. A third section 1114 extends substantially axially aft from a radially outer end 1116 of angled section 1110. Brake disk 1104 is coupled to an aft end 1118 of third section 1114 via a plurality of fasteners 1120 to form a joint 1122, and brake disk 1104 extends substantially radially inward from joint 1122.

Drivetrain 1100 includes an offset stator housing 1124 having an aft wall 1126 that includes a first portion 1128, a second portion 1130 that is axially offset in an aft direction 1132 from first portion 1128 and that defines a recess 1134 in aft wall 1126, and a third portion 1136 that extends between first portion 1128 and second portion 1130. Caliper 1106 is fixedly coupled to second portion 1130 and is sized and oriented to receive at least a portion 1138 of brake disk 1104 therein. More specifically, caliper 1106 is inverted, i.e., oriented radially outward, to receive radially inwardly extending brake disk 1104 therein.

In the illustrated alternative embodiment, a flange 1140 extends radially outward from aft end 1118 of third portion 1114. A dust seal 1142 is coupled to flange 1140 and extends axially aft therefrom to abut aft wall 1126 at third portion 1136 and substantially prevent contaminates from entering generator braking system 310. Alternatively, dust seal 1142 may abut any area on aft wall 1126 to enable braking system 310 to function as described herein.

One particular advantage of the embodiment illustrated in FIG. 12 is that such a configuration permits a larger diameter brake disk compared to the embodiments of FIGS. 7, 8 and 9, and thereby a lower rating and/or reduced number of the brake calipers and reduced heating. Furthermore, by mounting the conical torque tube to the gearbox output shaft/coupling disk, heat generated in the disk ring during braking events will not substantially pass to the generator rotor, thereby preventing potential damage to the generator rotor, especially for rotors with permanent magnets Exemplary embodiments of drivetrain assemblies for wind turbine generators are described in detail above. The above-described drivetrain assemblies provide an integrated gearbox/generator unit that reduces an overall size and weight of the drivetrain by eliminating unused space within the generator housing and reducing the frame length of the wind turbine. Such a design allows for generator bearings to be contained within the gearbox, and further facilitates sharing lubricant between generator and gearbox bearings. Further, embodiments described herein provide a drivetrain that enables a generator rotor center of gravity (CG) to be substantially axially aligned with the generator bearings. Such a design facilitates reducing loads exerted on the generator bearings during operation and further facilitates increasing an operational life of the bearings.

Moreover, embodiments described herein provide an encoder that determines a position and a velocity of the generator rotor during operation and transmits the determined position and velocity data to a power electronic converter and to other wind turbine controls to facilitate increasing an efficiency of the wind turbine generator. Moreover, grounding brushes described herein provide an electrical connection from the generator rotor to ground via the gearbox housing. Such a configuration facilitates maintaining a substantially low voltage across the generator and gearbox bearings, and thereby facilitates protecting gearbox bearings from potentially harmful electrical bearing currents.

The embodiments described herein further provide an insulated joint between the generator rotor and the gearbox output shaft to provide additional protection of the generator and gearbox bearings from potentially harmful electrical bearing currents. The common practice in the wind turbine industry, as well as the electric motor/generator industry is to insulate the generator (or motor) bearings directly via the addition of an insulating coating or material surrounding the bearings, or even via the use of insulating ceramic rolling elements, e.g. balls. However, the common practice is not effective or practical for the drivetrain of this invention due to the large number of generator and gearbox bearings at risk from harmful electrical currents.

It should be understood that the mounting location for the rotating elements of the brake systems of the different embodiments is not limited to that illustrated in the Figures. For example, brake drum 802 of drivetrain 800 (FIG. 9) may alternatively be coupled to the coupling disk outer portion 356 via bolts 358 (FIG. 4).

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

While the apparatus and methods described herein are described in the context of drivetrain assemblies for use with wind turbine generators, it is understood that the apparatus and methods are not limited to wind turbine applications. Likewise, the system components illustrated are not limited to the specific embodiments described herein but, rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drivetrain for a wind turbine, said drivetrain comprising:
    a gearbox comprising a housing and an output shaft rotatably coupled within said housing, said gearbox further comprising at least one bearing positioned between said housing and said output shaft;
    a braking system operatively coupled to said gearbox, said braking system comprising a rotary component and a stationary component;
    a generator comprising:
        a stator coupled to said housing such that said stator is positioned radially inward from said housing; and,
        a rotor coupled to said output shaft such that said rotor is positioned radially inward from said stator; and,
    an insulating ring, wherein said rotor is coupled to said output shaft via a coupling disk such that a substantially insulated joint is defined between said coupling disk and said rotor using said insulating ring, wherein, said gearbox output shaft and said at least one bearing facilitate supporting said braking system rotary component.

2. A drivetrain for a wind turbine in accordance with claim 1, wherein said generator further comprises a plurality of generator bearings, wherein a rotor center of gravity (CG) is substantially axially aligned with said plurality of generator bearings.

3. A drivetrain for a wind turbine in accordance with claim 1, wherein said stator facilitates supporting said braking system stationary component.

4. A drivetrain for a wind turbine in accordance with claim 1, wherein said rotor is coupled to said output shaft via said coupling disk such that a center of gravity of said rotor is positioned substantially about said at least one bearing.

5. A drivetrain for a wind turbine in accordance with claim 1, wherein said braking system comprises:
    at least one disk brake coupled to said output shaft via a brake torque tube; and,
    at least one braking pad coupled to a brake caliper, wherein said brake caliper is coupled to and extends from a stator external frame.

6. A drivetrain for a wind turbine in accordance with claim 1, wherein said braking system comprises:
    a brake drum coupled to said output shaft via a brake torque tube; and,
    at least one braking shoe configured to engage said brake drum during braking operations.

7. A drivetrain for a wind turbine in accordance with claim 6, wherein said braking system is at least one of pneumatic and hydraulic.

8. A drivetrain for a wind turbine in accordance with claim 6, wherein said at least one braking shoe is positioned within said brake drum to facilitate engaging said brake drum during braking operations.

9. A drivetrain for a wind turbine in accordance with claim 1, wherein said output shaft comprises an axially aft end including a plurality of gear teeth, said drivetrain further comprising an encoder operatively coupled to said output shaft via a corresponding plurality of gear teeth, said encoder configured to determine a position of said rotor.

10. A drivetrain for a wind turbine in accordance with claim 1, further comprising a brush element extending from a portion of said rotor to a portion of said housing, said brush element configured to provide an electrical connection between said rotor and said gearbox.

11. A wind turbine comprising:
a nacelle; and,
a drivetrain positioned within said nacelle, said drivetrain comprising:
    a gearbox comprising a housing and an output shaft rotatably coupled within said housing, said gearbox further comprising at least one bearing positioned between said housing and said output shaft;
    a braking system operatively coupled to said gearbox, said braking system comprising a rotary component and a stationary component;
    a generator comprising:
        a stator coupled to said housing such that said stator is positioned radially inward from said housing; and,
        a rotor coupled to said output shaft such that said rotor is positioned radially inward from said stator; and,
    an insulating ring, wherein said rotor is coupled to said output shaft via a coupling disk such that a substantially insulated joint is defined between said coupling disk and said rotor using said insulating ring, wherein, said gearbox output shaft and said at least one bearing facilitates supporting said braking system rotary component.

12. A wind turbine in accordance with claim 11, wherein said generator further comprises a plurality of generator bearings, wherein a rotor center of gravity (CG) is substantially axially aligned with said plurality of generator bearings.

13. A wind turbine in accordance with claim 11, wherein said stator facilitates supporting said braking system stationary component.

14. A wind turbine in accordance with claim 11, wherein said rotor is coupled to said output shaft via said coupling disk such that a center of gravity of said rotor is positioned substantially about said at least one bearing.

15. A wind turbine in accordance with claim 11, wherein said braking system comprises:
at least one disk brake coupled to said output shaft via a brake torque tube; and,
at least one braking pad coupled to a brake caliper, wherein said brake caliper is coupled to and extends from a stator external frame.

16. A wind turbine in accordance with claim 11, wherein said braking system comprises:
a brake drum coupled to said output shaft via a brake torque tube; and,
at least one braking shoe configured to engage said brake drum during braking operations.

17. A wind turbine in accordance with claim 11, wherein said braking system is at least one of pneumatic and hydraulic.

18. A wind turbine in accordance with claim 11, wherein said output shaft comprises an axially aft end including a plurality of gear teeth, said drivetrain further comprising an encoder operatively coupled to said output shaft via a corresponding plurality of gear teeth, said encoder configured to determine a position of said rotor.

19. A wind turbine in accordance with claim 11, further comprising a brush element extending from a portion of said rotor to a portion of said housing, said brush element configured to provide an electrical connection between said rotor and said gearbox.

20. A method for assembling a drivetrain for a wind turbine, said method comprising:
providing a generator which includes a stator and a rotor;
rotatably coupling an output shaft within a gearbox housing;
positioning at least one bearing between the gearbox housing and the output shaft to facilitate rotation of the output shaft;
operatively coupling a braking system to the gearbox housing, wherein the braking system comprises a rotary component and a stationary component;
supporting the braking system rotary component with the gearbox output shaft and the at least one bearing;
coupling the stator to the gearbox housing such that the stator is positioned radially inward from the gearbox housing; and,
coupling the rotor to the output shaft through an insulating ring and a coupling disk such that the rotor is positioned radially inward with respect to the stator and a substantially insulated joint is defined between the coupling disk and the rotor using the insulating ring.

21. A method in accordance with claim 20, wherein coupling the rotor to the output shaft further comprises positioning a center of gravity of the rotor substantially about the at least one bearing.

22. A method in accordance with claim 20, wherein operatively coupling the braking system to the gearbox housing further comprises:
coupling at least one disk brake to the output shaft via a brake torque tube; and,
coupling at least one braking pad to a brake caliper, wherein the brake caliper is coupled to and extends from a stator external frame.

23. A method in accordance with claim 20, wherein operatively coupling the braking system to the gearbox housing further comprises:
coupling a brake drum to the output shaft via a brake torque tube; and,
providing at least one braking shoe configured to engage the brake drum during braking operations.

24. A method in accordance with claim 23, wherein operatively coupling the braking system to the gearbox housing further comprises engaging the braking system using at least one of pneumatic and hydraulic power.

25. A method in accordance with claim 23, wherein providing at least one braking shoe further comprises positioning the at least one braking shoe within the brake drum to facilitate engaging the brake drum during braking operations.

* * * * *